United States Patent Office 3,157,655
Patented Nov. 17, 1964

3,157,655
PYRAZOLOPYRIMIDINE DERIVATIVE
Akira Takamizawa, Ibaraki-shi, Osaka, Yoshio Hamashima, Nishinomiya-shi, Hyogo, and Hisao Sato, Takatsuki-shi, Osaka, Japan, assignors to Shionogi & Co., Ltd., Osaka, Japan
No Drawing. Filed Aug. 10, 1962, Ser. No. 216,058
Claims priority, application Japan May 18, 1962
2 Claims. (Cl. 260—256.4)

The present invention relates to a new pyrazolopyrimidine derivative, 2,3,6-trimethyl-7-aminopyrazolo[1,5-a]-pyrimidine, and production thereof.

The new pyrazolopyrimidine derivative shows a variety of pharmacological activities such as anti-pyretic, analgesic and anti-inflammatory activities. It may be especially noted that the anti-pyretic activity of the new pyrazolopyrimidine derivative is prolonged for a longer time than that of the well-known anti-pyretic agent, aminopyrine (4 - dimethylamino - 2,3 - dimethyl-1-phenyl-3-pyrazoline-5-one). Thus, the compound is useful as a long-acting anti-pyretic agent. The compound can be used as a medicament in the form of pharmaceutical preparations, which contain the new compound or a salt thereof in admixture with a pharmaceutical organic or inorganic solid or liquid carrier suitable for enteral or parenteral administration. For making up the preparations there can be employed substances which do not react with the new compound, such as water, gelatine, lactose, starches, magnesium stearate, talc, vegetable oils, benzyl alcohols, gums, polyalkylene glycols, petroleum jelly or any other known carrier for medicaments. The pharmaceutical preparations may be, for example, in solid form as tablets, dragees or capsules, or in liquid form, for example, as solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances.

The new compound may be prepared according to the process represented by the following formula:

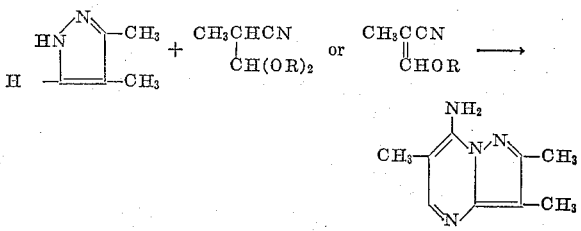

wherein R is a lower alkyl radical, such as methyl, propyl, butyl or pentyl. Thus, the process can be accomplished by substantially condensing 3,4-dimethyl-5-aminopyrazole with α-dialkoxymethyl-propionitrile or α-alkoxymethylene-propionitrile.

One of the starting materials is 3,4-dimethyl-5-aminopyrazole, which can be prepared, for example, by heating α-acetopropionitrile with hydrazine in the presence of an acid in a lower alkanol [British Patent 788,140]. The 3,4-dimethyl-5-aminopyrazole may be employed as the starting material in the form of the free base or a salt thereof, for example, acetate, propionate or hydrochloride. The other starting material is α-dialkoxymethylpropionitrile or α-alkoxymethylenepropionitrile. The former can be prepared, for example, by reducing α-dialkoxymethylacryronitrile in a lower alkanol using palladium catalyst [J. Pharm. Soc. Japan, 78, 632 (1958)] and the latter prepared, for example, by heating the thus-prepared α-dialkoxymethylpropionitrile in the presence of an acidic catalyst whereby alkanol is eliminated [J. Pharm. Soc. Japan, 79, 814 (1959)].

The reaction may be carried out by heating 3,4-dimethyl-5-aminopyrazole or a salt thereof with α-dialkoxymethylpropionitrile or α-alkoxymethylenepropionitrile in the presence of an acidic catalyst, such as hydrochloric acid, sulfuric acid, acetic acid or p-toluenesulfonic acid in a suitable solvent, such as methanol, ethanol, propanol, acetone, acetic acid, dioxane or dimethylformamide while refluxing. Under these conditions, the reaction time is usually from 4 to 8 hours. Both higher and lower temperature than the reflux temperature of the reaction mixture and shorter and longer reaction times than the said time are operative, the lower tempereature usually requiring a correspondingly longer reaction time.

Depending on the conditions used the new compound is obtained in the form of the free base or as a salt thereof. A salt may be converted into the free base in a conventional manner, for example, by treating with an alkaline substance, such as sodium hydroxide, potassium hydroxide, sodium carbonate, potassium carbonate, sodium bicarbonate or aqueous ammonia. The free base may be transformed into its therapeutically useful acid addition salts by treating with an appropriate inorganic or organic acid, such as hydrochloric acid, hydrobromic acid, sulfuric acid, phosphoric acid, formic acid, acetic acid, lactic acid, succinic acid, maleic acid, malic acid, tartaric acid, citric acid, ascorbic acid, cinnamic acid, salicyclic acid, 4-aminosalicyclic acid, 2-phenoxybenzoic acid, methanesulfonic acid, benzenesulfonic acid, sulfanilic acid, methionine, lysine or arginine, in a suitable solvent, such as methanol, ethanol, ether or acetone.

The following example sets forth illustratively presently-preferred embodiment of the invention.

In the example, the abbreviations have the following significances: g., gram(s); ml., millilitre(s); Anal. Calcd., analysis calculated; and ° C., degrees centigrade. Other abbreviations have conventional significances.

*Example*

To a solution of 3,4-dimethyl-5-aminopyrazole acetate (5.0 g.) in 99% ethanol (60 ml.), there are added α-methoxyethoxymethylpropionitrile (4.6 g.) and conc. hydrochloric acid (3.1 g.), and the resultant solution is refluxed for 6 hours on a water bath. After allowing to stand overnight, the reaction mixture is concentrated under a reduced pressure to a half volume. The precipitated crystals are recrystallized from 99% ethanol to give 2,3,6-trimethyl-7-aminopyrazole[1,5-a]pyrimidine hydrochloride (1.8 g.) as colorless needles melting at 293 to 295° C. (decomp.).

*Analysis.*—Calcd. for $C_9H_{12}N_4 \cdot HCl$: N, 26.35. Found: N, 26.65.

The above-prepared hydrochloride is treated with aqueous sodium carbonate to give the free base, which is crystallized from dilute ethanol to give 2,3,6-trimethyl-7-aminopyrazolo[1,5-a]pyrimidine as colorless prisms melting at 231 to 232° C. (decomp.).

*Analysis.*—Calcd. for $C_9H_{12}N_4$: C, 61.34; H, 6.86; N, 31.80. Found: C, 61.18; H, 6.95; N, 31.52.

2,3,6 - trimethyl - 7 - aminopyrazolo[1,5-a]pyrimidine is characterized by its prolonged anti-pyretic activity with less toxicity. For instance, when the new pyrazolopyrimidine derivative is subcutaneously administered to mice weighing from 15 to 17.5 grams at a dose of 100 milligrams per kilogram of bodyweight, the depression of the bodily temperature was maintained for more than 180 minutes. On the contrary, the depression caused by a commercially available anti-pyretic agent, aminopyrine (4 - dimethylamino - 2,3-dimethyl-1-phenyl-3-pyrazolin-5-one), disappeared 120 minutes after the administration.

The anti-pyretic test data is shown in the following table:

| Time after administration (minutes) | Temperature difference (°C.) | | | | | |
|---|---|---|---|---|---|---|
| | 0 | 30 | 60 | 120 | 180 | 2400 |
| Test compound: | | | | | | |
| The new pyrazolopyrimidine derivative | 0 | −2.39 | −2.47 | −1.17 | −1.03 | −0.48 |
| Aminopyrine | 0 | −2.58 | −2.14 | +0.38 | +0.35 | not done |

In acute toxicity using mice, the $LD_{50}$ (lethal dose) of the new pyrazolopyrimidine derivative was 408 milligrams per kilogram of bodyweight, while that of aminopyrine was 354.5 milligrams per kilogram of bodyweight.

The new pyrazolopyrimidine derivative also shows stronger analgesic and anti-inflammatory activities than aminopyrine. For instance, in the analgesic activity test using mice and the anti-inflammatory activity test using rats, the former was 1.15 times and 2 times as effective as the latter, respectively.

What is claimed is:
1. 2,3,6 - trimethyl - 7 - aminopyrazolo[1,5 - a]pyrimidine.
2. 2,3,6 - trimethyl - 7 - aminopyrazolo[1,5 - a]pyrimidine hydrochloride.

References Cited in the file of this patent
UNITED STATES PATENTS

| 2,937,118 | Haxthausen et al. | May 17, 1960 |
| 2,980,677 | Druey et al. | Apr. 18, 1961 |
| 3,024,166 | Kuna et al. | Mar. 6, 1962 |
| 3,037,980 | Hitchings et al. | June 5, 1962 |

OTHER REFERENCES

Meyers: J. Prakt. Chem., vol. 92 (N.F.); pages 186–188 (1915), T.P.I.J. 89.